(12) United States Patent
Lofthus et al.

(10) Patent No.: US 8,725,059 B2
(45) Date of Patent: May 13, 2014

(54) SYSTEM AND METHOD FOR RECOMMENDING EDUCATIONAL RESOURCES

(75) Inventors: Robert M. Lofthus, Webster, NY (US); Kristine A. German, Webster, NY (US); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 430 days.

(21) Appl. No.: 12/771,534

(22) Filed: Apr. 30, 2010

(65) Prior Publication Data

US 2010/0227306 A1    Sep. 9, 2010

Related U.S. Application Data

(63) Continuation-in-part of application No. 12/339,979, filed on Dec. 19, 2008, and a continuation-in-part of application No. 12/340,054, filed on Dec. 19, 2008, now abandoned, and a continuation-in-part of application No. 12/340,116, filed on Dec. 19, 2008, now Pat. No. 8,457,544, and a continuation-in-part of application No. 12/054,824, filed on Mar. 25, 2008, now abandoned, and a continuation-in-part of application No. 11/749,192, filed on May 16, 2007, now abandoned.

(51) Int. Cl.
*G09B 3/00*    (2006.01)

(52) U.S. Cl.
USPC ............................ 434/350; 434/322; 434/323

(58) Field of Classification Search
CPC ............ G09B 7/073; G09B 7/07; G09B 7/04; G09B 7/02; G09B 3/00
USPC ......................... 434/118, 322, 323, 336, 350

See application file for complete search history.

(56) References Cited

U.S. PATENT DOCUMENTS

| | | | |
|---|---|---|---|
| 4,464,118 | A | 8/1984 | Scott et al. |
| 4,654,818 | A | 3/1987 | Wetterau, Jr. |

(Continued)

FOREIGN PATENT DOCUMENTS

| | | |
|---|---|---|
| EP | 553674 A2 | 8/1993 |
| EP | 0556530 | 8/1993 |

(Continued)

OTHER PUBLICATIONS

The Abecedarian Reading Assessment, Sebastian Wren, Ph.D and Jennifer Watts, Ph.D., Copyright, 2002.

(Continued)

*Primary Examiner* — Bruk Gebremichael
(74) *Attorney, Agent, or Firm* — Fay Sharpe LLP

(57) ABSTRACT

An educational recommender system and a method for recommending an educational game to be used by a group of at least two students are provided. The method includes receiving a request to recommend an educational game to use with the group of students, and accessing student data relating to the at least two students including granular assessment data. The granular assessment data includes a result of at least one assessment administered to respective students, wherein each assessment includes a plurality of problems for assessing at least one of the students and the associated result includes an independent evaluation of each respective problem. The method further includes selecting an educational game that exercises the students in an academic area, including selecting the level of the academic area exercised based on granular assessment data associated with each of the respective students.

20 Claims, 4 Drawing Sheets

(56) References Cited

U.S. PATENT DOCUMENTS

| | | | |
|---|---|---|---|
| 4,793,810 A | 12/1988 | Beasley, Jr. | |
| 5,183,398 A * | 2/1993 | Monte et al. | 434/227 |
| 5,387,107 A | 2/1995 | Gunter | |
| 5,657,256 A | 8/1997 | Swanson | |
| 5,730,602 A | 3/1998 | Gierhart et al. | |
| RE36,028 E | 1/1999 | Deesen et al. | |
| 5,995,959 A | 11/1999 | Friedman | |
| 5,995,961 A | 11/1999 | Levy et al. | |
| 6,030,226 A | 2/2000 | Hersh | |
| 6,120,300 A | 9/2000 | Ho | |
| 6,134,559 A | 10/2000 | Brumme | |
| 6,144,838 A | 11/2000 | Sheehan | |
| 6,154,757 A | 11/2000 | Krause | |
| 6,215,901 B1 | 4/2001 | Schwartz | |
| 6,299,452 B1 | 10/2001 | Wasowicz | |
| 6,515,690 B1 | 2/2003 | Back | |
| 6,523,007 B2 | 2/2003 | Layng | |
| 6,606,479 B2 | 8/2003 | Cook et al. | |
| 6,606,480 B1 | 8/2003 | L'Allier | |
| 6,673,611 B2 | 1/2004 | Thompson et al. | |
| 6,755,657 B1 | 6/2004 | Wasowicz | |
| 6,759,206 B1 | 7/2004 | Rubin et al. | |
| 6,789,089 B2 | 9/2004 | Scoggins | |
| 6,953,343 B2 | 10/2005 | Townshend | |
| 6,983,240 B2 | 1/2006 | Ait-Mokhtar et al. | |
| 7,036,075 B2 | 4/2006 | Walker | |
| 7,058,567 B2 | 6/2006 | Ait-Mokhtar et al. | |
| 7,147,473 B2 | 12/2006 | Harpaz | |
| 7,152,034 B1 | 12/2006 | Layng | |
| 7,207,804 B2 | 4/2007 | Hersh | |
| 7,266,340 B2 | 9/2007 | Bresciani | |
| 7,293,239 B2 | 11/2007 | Gorbet | |
| 7,593,910 B1 | 9/2009 | Owen | |
| 7,734,652 B2 | 6/2010 | Tamayo | |
| 7,828,552 B2 | 11/2010 | Shute | |
| 2002/0125637 A1* | 9/2002 | Leis | 273/272 |
| 2003/0049592 A1* | 3/2003 | Park | 434/322 |
| 2003/0113698 A1 | 6/2003 | Von der Geest | |
| 2003/0180703 A1 | 9/2003 | Yates et al. | |
| 2003/0190593 A1 | 10/2003 | Wisnosky | |
| 2004/0009462 A1* | 1/2004 | McElwrath | 434/350 |
| 2004/0023191 A1 | 2/2004 | Brown | |
| 2004/0049391 A1 | 3/2004 | Polanyi | |
| 2004/0076930 A1 | 4/2004 | Steinberg | |
| 2004/0121298 A1 | 6/2004 | Creamer | |
| 2004/0180317 A1 | 9/2004 | Bodner et al. | |
| 2004/0219502 A1 | 11/2004 | Bechard | |
| 2005/0114160 A1 | 5/2005 | Boehme et al. | |
| 2005/0138556 A1 | 6/2005 | Brun | |
| 2005/0170325 A1 | 8/2005 | Steinberg | |
| 2005/0197988 A1 | 9/2005 | Bublitz | |
| 2005/0221266 A1 | 10/2005 | Mislevy | |
| 2005/0227216 A1 | 10/2005 | Gupta | |
| 2005/0246354 A1* | 11/2005 | Tamayo et al. | 707/100 |
| 2006/0040240 A1 | 2/2006 | Kopilevich | |
| 2006/0095852 A1 | 5/2006 | Trepess et al. | |
| 2006/0112105 A1* | 5/2006 | Adamic et al. | 707/10 |
| 2006/0223041 A1* | 10/2006 | Beck et al. | 434/307 R |
| 2006/0241988 A1 | 10/2006 | Yaskin | |
| 2006/0242003 A1 | 10/2006 | Yaskin | |
| 2006/0242004 A1 | 10/2006 | Yaskin | |
| 2007/0172810 A1 | 7/2007 | McCallum | |
| 2007/0179776 A1 | 8/2007 | Segond | |
| 2007/0190514 A1 | 8/2007 | Diaz | |
| 2007/0218432 A1 | 9/2007 | Glass | |
| 2008/0038708 A1 | 2/2008 | Slivka | |
| 2008/0254431 A1* | 10/2008 | Woolf et al. | 434/322 |
| 2008/0286732 A1 | 11/2008 | German | |
| 2009/0181356 A1* | 7/2009 | Dasgupta | 434/362 |
| 2009/0204596 A1 | 8/2009 | Brun | |
| 2009/0246744 A1 | 10/2009 | Lofthus et al. | |
| 2009/0271433 A1 | 10/2009 | Perronnin et al. | |
| 2009/0287739 A1 | 11/2009 | Zhang | |
| 2010/0075290 A1 | 3/2010 | DeYoung | |
| 2010/0075291 A1 | 3/2010 | DeYoung | |
| 2010/0075292 A1 | 3/2010 | DeYoung | |
| 2010/0100455 A1 | 4/2010 | Song | |
| 2010/0157345 A1 | 6/2010 | Lofthus | |
| 2010/0158707 A1 | 6/2010 | Griffiths | |
| 2010/0159432 A1 | 6/2010 | German | |
| 2010/0159437 A1 | 6/2010 | German | |
| 2010/0159438 A1 | 6/2010 | German | |
| 2010/0227306 A1 | 9/2010 | Lofthus | |

FOREIGN PATENT DOCUMENTS

| | | |
|---|---|---|
| EP | 0 805 410 A | 5/1997 |
| EP | 805410 A3 | 3/1999 |
| JP | 2000123115 | 4/2000 |
| JP | 2000123115 A2 | 4/2000 |
| WO | WO 98/32107 | 7/1998 |
| WO | WO 02/21259 | 3/2002 |
| WO | WO 2004/090834 | 10/2004 |
| WO | WO2006121542 A2 | 11/2006 |

OTHER PUBLICATIONS

Chuat, "CategoriX & ClusteriX", Xerox Research Centre Europe, licensing@xrce.xerox.com (May 2005).

U.S. Appl. No. 12/640,426, filed Dec. 17, 2009, Venable.

U.S. Appl. No. 12/701,850, filed Dec. 8, 2010, DeYoung.

U.S. Appl. No. 12/840,584, filed Jul. 21, 2010, Venable.

U.S. Appl. No. 12/958,768, filed Dec. 2, 2010, German.

Johnson, David W. et al., "An Overview of Cooperative Learning", Cooperative Learning Institute and Interaction Book Company.

Shi, Jianbo et al., "Normalized Cuts and Image Segmentation", IEEE Transactions on Pattern Alanaysis and Machine Intelligence, Vo. 22, No. 8, Aug. 2000.

Wren, Ph.D., Sbebastian et al., "The Abecedarian Reading Assessment", www.balancedreading.com. Copyright, 2002. pp. 1-49.

"Cluster Analysis." *Wikipedia, the Free Encyclopedia.* Apr. 28, 2010. Web. Jan. 11, 2011. http://en.wikipedia.org/wiki/Cluster_analysis>.

"Cut (graph theory)." *Wikipedia, the Free Encyclopedia,* Mar. 26, 2010. Web. Jan. 11, 2011. <http://en.wikipedia.org/wiki/Cut_(graph_theory)>.

"Edmonds's Matching Algorithm." *Wikipedia, the Free Encyclopedia.* Feb. 16, 2010. Web. Jan. 11, 2011. <http://en.wikipedia.org/wiki/Edmond's_matching_algorithm>.

"Ford-Fulkerson Algorithm." *Wikipedia, the Free Encyclopedia.* Apr. 21, 2010. Web. Jan. 11, 2010. <http://en.wikipedia.org/wiki/Ford-Fulkerson_algorithm>.

"k-medoids" *Wikipedia, the Free Encyclopedia.* Apr. 22, 2010. Web. Jan. 11, 2010. <http://en.wikipedia.org/wiki/K-medoids>.

"Matching (graph theory) )." *Wikipedia, the Free Encyclopedia.* Apr. 19, 2009. Web. Jan. 11, 2011. <http://en.wikipedia.org/wiki/Matching_(graph_theory)>.

International Search Report for EP 09 17 7730 dated Apr. 28, 2010.

\* cited by examiner

SYSTEM AND METHOD FOR RECOMMENDING EDUCATIONAL RESOURCES

CROSS-REFERENCE TO RELATED APPLICATIONS

The present application is a continuation in part to U.S. patent application Ser. No. 11/749,192, filed on May 16, 2007; U.S. patent application Ser. No. 12/054,824, filed on Mar. 25, 2008; and U.S. patent application Ser. Nos. 12/339,979, 12/340,054, and 12/340,116, all filed on Dec. 19, 2008.

The present application is related to U.S. patent application Ser. No. 12/109,496, filed on Apr. 25, 2008; U.S. patent application Ser. No. 12/237,692, filed on Sep. 25, 2008; U.S. patent application Ser. Nos. 12/339,771, 12/339,804 both filed on Dec. 19, 2008; U.S. application patent Ser. No. 12/341,659, filed on Dec. 22, 2008; U.S. patent application Ser. No. 12/624,960, filed on Nov. 24, 2009; and U.S. patent application Ser. No. 12/640,426, filed on Dec. 17, 2009.

TECHNICAL FIELD

The present disclosure relates generally to a system and method for recommending educational games. In particular, the present disclosure relates to clustering students based on granular assessment data for engaging in a cooperative learning activity involving two or more students, and/or to recommending a cooperative learning activity based on characteristics of two or more students that will engage in the activity, where the characteristics include evaluation of granular results of educational assessments.

BACKGROUND

Cooperative learning includes activities involving small groups of two or more students in which each individual is accountable for his own contributions, and further contributes to the success of the group, such that the group may sink or swim together. Students must use interpersonal and problem solving skills when engaging in these activities. The benefits of cooperative learning are maximized when the groups are strategically composed, and when the activities are selected to best complement the group by challenging them in areas that they are in the process of mastering. Thus, the activities can reinforce and enhance new skills without boring or frustrating the student.

SUMMARY

The present disclosure is directed to an educational recommender system for recommending an educational game to be used by a group of at least two students. The system includes at least one tangible processor and a memory with instructions to be executed by the at least one tangible processor for receiving a request to recommend an educational game to use with the group of students, and accessing student data relating to the at least two students including granular assessment data. The granular assessment data includes a result of at least one assessment administered to respective students, wherein each assessment includes a plurality of problems for assessing at least one of the students and the associated result includes an independent evaluation of each respective problem. The executable instructions are further executed for selecting an educational game that exercises the students in an academic area, including selecting the level of the academic area exercised based on granular assessment data associated with each of the respective students.

The present disclosure is also directed to a method for recommending an educational game to be used by a group of at least two students. The method includes receiving a request to recommend an educational game to use with the group of students, accessing student data relating to the at least two students including granular assessment data. The granular assessment data includes a result of at least one assessment administered to respective students, wherein each assessment includes a plurality of problems for assessing at least one of the students and the associated result includes an independent evaluation of each respective problem. The method further includes selecting an educational game that exercises the students in an academic area, including selecting the level of the academic area exercised based on granular assessment data associated with each of the respective students.

The present disclosure is also directed to a computer-readable medium storing a series of programmable instructions configured for execution by at least one hardware processor for recommending an educational game to be used by a group of at least two students, including the steps of receiving a request to recommend an educational game to use with the group of students, and accessing student data relating to the at least two students including granular assessment data. The granular assessment data includes a result of at least one assessment administered to respective students, wherein each assessment includes a plurality of problems for assessing at least one of the students and the associated result includes an independent evaluation of each respective problem. Additionally, the steps include selecting an educational game that exercises the students in an academic area, including selecting the level of the academic area exercised based on granular assessment data associated with each of the respective students.

Other features of the presently disclosed recommender system will become apparent from the following detailed description, taken in conjunction with the accompanying drawings, which illustrate, by way of example, the presently disclosed recommender system.

BRIEF DESCRIPTION OF THE DRAWINGS

Various embodiments of the present disclosure will be described below with reference to the figures, wherein.

DETAILED DESCRIPTION

Figure 1:
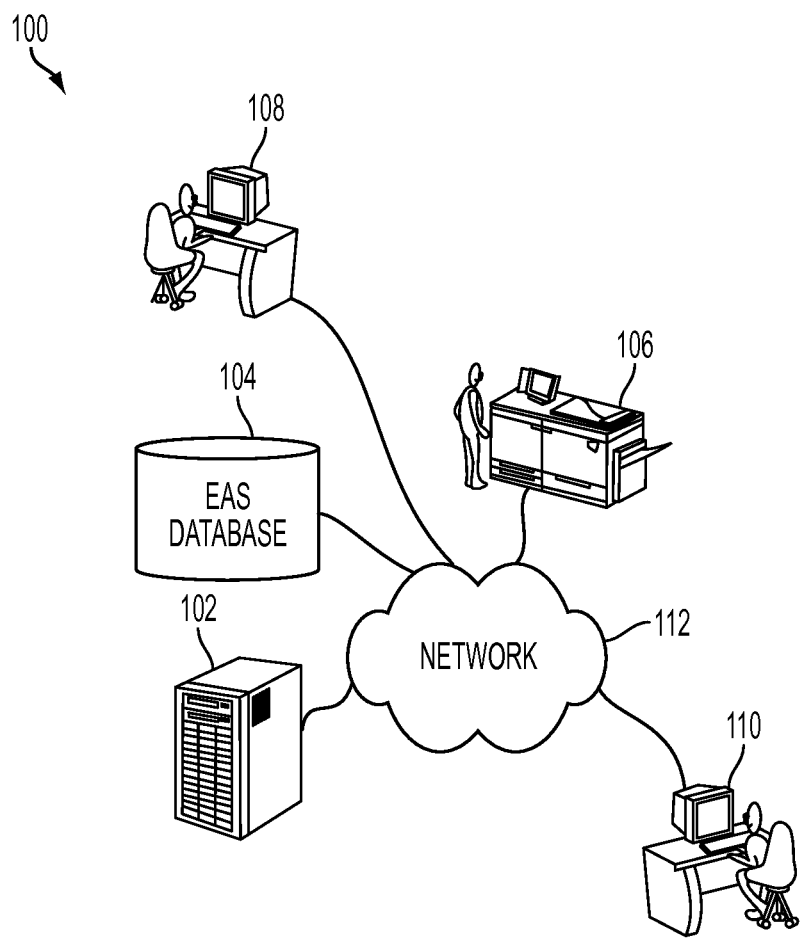
FIG. 1 is a schematic diagram of an exemplary educational recommender system in accordance with the present disclosure.

Referring now to the drawing figures, in which like references numerals identify identical or corresponding elements, the educational recommender system and method in accordance with the present disclosure will now be described in detail. With initial reference to FIG. 1, an exemplary educational recommender system in accordance with the present disclosure is illustrated and is designated generally as educational recommender system 100.

Recommender system 100 includes a server 102, data storage facility 104, at least one multifunction device (MFD) 106 and first and second workstations 108 and 110. Each of the components of recommender system 100 is in data communication with at least one of the other components via network 112.

The server 102 recommends educational cooperative games for two or more students to play. The server selects the games and/or the content of the games based on characteristics of the students, including granular assessment data (described further below) related to their past academic performance. The content, e.g., information presented to or used by players, of the games may be dynamic. For example, the same game may be played by different students, but the content is selected in accordance with granular assessment data associated with the students who are playing the game. In another example, the same game may be played by the same group of students more than once over time, with assessments administered to the students in between first and second occurrences, for example, of playing the game. Granular assessment data associated with the administered assessment is used to select new content for the game the second time that the game is played.

The term game here includes one or more activities that are performed in accordance with rules or instructions. The game may be competitive or non-competitive, and may include an activity that students perform collaboratively or independently. The game may be, for example, a board game, an electronic game, or instructions to perform a project, such as a research project or multimedia project.

The assessments and granular data are now described. An author can create an assessment at first workstation 108, which may then be stored in data storage facility 104. An assessment may be retrieved from storage and copies may be printed, e.g., using MFD 106. It is also possible that the author created the assessment manually, e.g., by typing or handwriting it. A teacher or administrator may administer the assessment to a group of one or more students, by providing each student with a copy of the assessment.

Each copy of the assessment may be individualized by providing information, such as a unique ID, identification (ID code or name) of the assessment-taker that will be administered the assessment, the date, etc. The individualized information may be encoded, such as in an optical code, e.g., a barcode.

The students take the assessment, including marking the assessment with strokes (e.g., hand drawn strokes using a writing implement, such as a pencil, crayon or pen) that indicate responses to at least one problem provided by the assessment. The term "problem" is applied broadly herein to refer to a prompt for the student's response or a gauge of the student's progress with respect to a task. For example, a problem may include a math problem, a reading selection that the student reads and is gauged for fluency, a survey question asking for the student's opinion, etc. In some cases, a person other than the student marks the assessment, but for the purpose of simplicity, reference to markings by a student shall also refer to any other person that is marking the assessment.

The assessment may be administered to the students in a variety of ways, including in writing, digitally, or in audio. When administered in writing, the student may mark the assessment itself or may mark one or more specially provided answer sheets. For simplicity and clarity, the term "marked assessment" includes any of the above. When administered digitally, the assessment is presented to the student via a display device of a computing device, such as personal computer or workstation. The student can mark the assessment with digital strokes by using a user input device, such as a keyboard. When administered in audio, the student may listen to the audio and mark answers on an answer sheet that is included with the assessment. It is also envisioned that the student may answer the assessment verbally. Whether the answer is provided by marking a paper using a handwriting instrument, marking a digital file using a computer, marking a digital recording using a voice, the mark is referred to herein as a stroke. Furthermore, there are typically indicators to the student as to where or when to mark a stroke.

Marked-up paper assessments are submitted to the MFD 106 to be scanned and then stored. The MFD 106 generates image data (e.g., a .pdf or .tif file) that corresponds to each marked assessment. The stored assessments are evaluated by the server 102, which includes retrieving strokes that were made by the students from the generated image data, evaluating the retrieved strokes, and generating evaluation results that correspond to the responses provided to the individual problems in the assessment. These results are granular assessment data, because they provide information about student performance on each individual problem. Furthermore, if the response to a problem is incorrect, the granular assessment data may provide information related to what type of mistake the student made. Different incorrect responses may generate different information that is included with the granular assessment data. Additionally, the evaluation results may include overall results for portions of the assessment or for the entire assessment.

The evaluated assessments may be validated and annotated by a user of the second workstation 110. The validated assessments may be resubmitted to the server 102, e.g., for reevaluation. The server 102 may generate reports relating to the evaluated and/or validated assessments.

Figure 2:
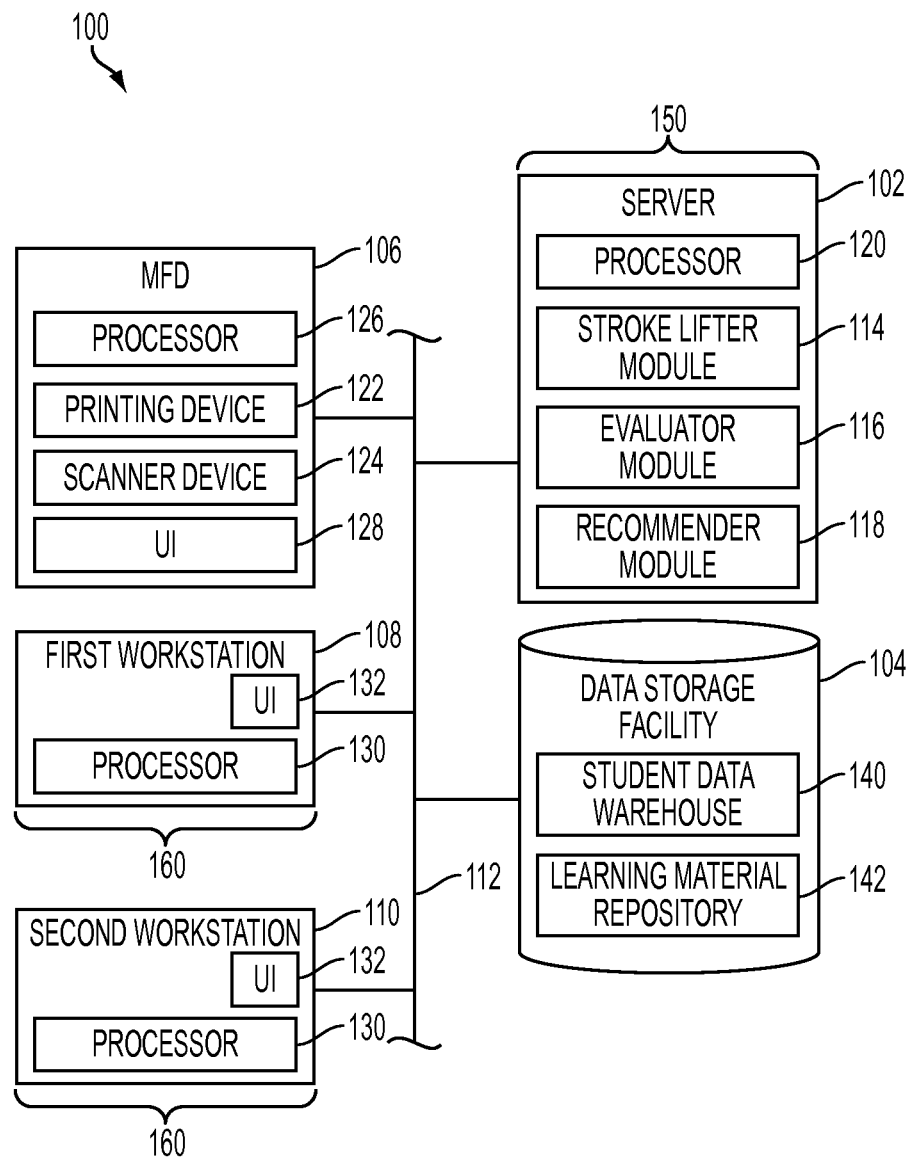
FIG. 2 shows a detailed block diagram of the components of the recommender system shown in FIG. 1 in accordance with the present disclosure.

Referring to FIG. 2, the server 102 is a computing device having a hardware processor 120 (e.g., a microprocessor or CPU); at least one storage device (e.g., RAM, ROM, flash memory, removable memory, etc.), and all necessary communication devices for communicating with the data storage facility 104, MFD 106, and/or first or second workstations 108 and 110, either directly or via the network 112. The server 102 may include a web server, a server, a minicomputer, a mainframe computer, a personal computer, a mobile computing device, etc.

The processor 120 executes a stroke lifter software module 114, evaluator software module 116, and a recommender software module 118, each of which is described further below. The stroke lifter software module 114, evaluator software module 116, and recommender software module 118 each include a series of programmable instructions capable of being executed by the processor 120. The series of programmable instructions can be stored on a computer-readable medium accessible by the processor 120, such as RAM, a hard drive, CD, smart card, 3.5" diskette, etc., for performing the functions disclosed herein and to achieve a technical effect in accordance with the disclosure. The functions of the stroke lifter software module 114, evaluator software module 116, and recommender software module 118 may be combined into one module or distributed among a different combination of modules and/or among different servers.

The data storage facility 104 includes at least one nonvolatile storage device for storing information that the server 102 needs to access for making requested recommendations. In the current example, the data storage facility 104 includes a first storage device for storing a student data warehouse 140 and a second storage device for storing learning material repository 142. Software necessary for accessing data in the data storage facility 104, including retrieving data, manipulating data and storing data, may be included with the server 102 and/or the data storage facility 104. The server 102 and the data storage facility 104 may be configured as one component or may be configured as separate components which are in data communication.

The data storage facility 104 may be a central database, a distributed database, or may include local storage associated with one or more of the components (e.g., server 102, MFD 106, and first and second workstations 108 and 110) of the recommender system 100. The components may share information, such as assessments, scanned assessments, validated assessments, evaluated assessments and reports related to evaluations of assessments, by storing information on and retrieving information from data storage facility 104. The method of sharing information may be done in a number of ways, such as a first component notifying a second component when a particular file is available for the second component to retrieve or process, the first component sending the file to the second component, or the second component checking the data storage facility 104 at regular intervals for files that it needs to retrieve for processing.

The student data warehouse 140 stores student data related to a plurality of students. The student data includes attributes associated with each student, such as, personal data which is substantially static, requiring little or infrequent updating (e.g., name, schools attended, school currently attending, birth date, gender, geographical location, socio-economic information, health information, school district, grade, classroom, etc.); and experiential data which is likely to be dynamic and frequently updated. The experiential data includes attribute data such as including granular assessment data (described further below), overall scores on particular assessments, proficiency (e.g., expressed in percentages) in a variety of academic areas, such as academic subjects (e.g., math, reading, division) and/or skills (e.g., critical thinking, penmanship, etc.); past experience and feedback data (e.g., educational activities used and completed or used and not yet completed). In one example, a portion of the student data, e.g., the personal data and/or experiential data, may be configured as metadata.

Each of the attributes in the experiential data for students, where appropriate, may be associated with a strength score which may be used for weighting purposes when determining sameness (described further below), such as expressed on a scale of 1 to 10, to indicate the strength of the attribute. Also associated with the attributes, particularly attributes related to assessment of mastery of a skill, is information describing which educator, methodology, style, materials, assessments, etc., were involved in educating the student with respect to the skill. This information may identify a particular educator, style, material, assessment, or may describe it, or one or more characteristics associated with it.

The learning material repository 142 includes educational material data. The educational material data include, for example, identification data, reproduction data, or digital game data. The identification data identify an educational game. The identified game may be a physical game, digital game, or a hybrid of a physical and digital game which include physical as well as digital game components.

A physical game is stored in a physical non-digital storage place, such as a shelf or file cabinet. Furthermore, a physical game has tangible pieces or parts, such as a game board, cards, dice, etc, at least a portion of which are not connected to digital data, such as for storing software instructions or executing software instructions.

A digital game is stored in a digital storage device, such as a database. The database may be included with the learning material repository 142. A digital game is connected to digital game data, such as for storing or executing the data. The digital game data include software instructions that are executable by a processor for interacting with a user via a user interface (UI), e.g., a graphical user interface (GUI) in order for the user to play the game. The digital game may be dynamic, such that the content delivered to the user is selectable. In accordance with the present disclosure, the content is selected based on one or more characteristics associated with the students who will be playing the game. The students who will be playing the game are clustered into one or more groups, each group including at least two students. Accordingly, the content is selected based on one or more characteristics of the clustered group(s).

The reproduction data include digital printable files (or references and/or links to the files) which can be used, once printed, to play or administer the game. Once printed, the printed material may be used independently to play or administer the game, or may be used to supplement another physical or digital game. Examples of printed material include Bingo cards, printable flash cards, a deck of "Go Fish" cards, etc. The data printed out may be formatted for printing on, for example, standard paper (e.g., letter size, typically 8.5"×11"), on custom sized paper or cards, or on stickers that may be placed on pre-existing cards. The printable files may be dynamic, so that the content of the printed material is selectable. In accordance with the present disclosure, the content is selected based on one or more characteristics associated with one or more characteristics of the clustered group(s).

As described above, the digital game data include files of software instructions (or references and/or links to the files) that are executable by a processor for interacting with a user via a user interface (UI), e.g., a GUI, in order for the user to play the game. The digital game may be dynamic, such that the content is selectable based on one or more characteristics of the clustered group(s).

The educational material data may have associated data, such as for providing the author or creator, publisher, educational style or methodology used, estimated game-play time, difficulty level, number of players than can play the game, subject matter, topic or curriculum section associated with the game, skills addressed by the game. The associated data or a portion thereof may be configured as metadata.

The MFD 106 includes a printing device 122, a scanner device 124, a processor 126, a user interface (UI) 128, and all necessary communication devices for communicating with the data storage facility 104, server 102, and/or client computing device 108, either directly or via the network 112. The printing device 122, scanner device 124, and processor 126 may be integrated and housed in a single housing or may be separate components which are interfaced to one another. The printing device 122 includes any apparatus or system, such as a digital copier, xerographic printing system, ink jet printing system, reprographic printing system, bookmaking machine, facsimile machine, etc., which performs a marking output function for any purpose. The modality for marking may include, for example, applying toner, ink, dye, etc., to a substrate. The substrate may be a material such as paper, cardboard, a transparency, a paper derivative, etc.

The scanner device 124 of the MFD 106 includes hardware and software for imaging a document and generating corresponding imaging data. The image data is stored by a storage device that is included with the processor 126, a storage device that is accessible to the processor 126, data storage facility 104 and/or the server 102. The processor 126 may execute a scanner software module for processing the image data, and/or the image data may be processed by the server 102.

The processor 126 may execute an educational recommender interface (ERI) software module for enabling the processor 126 to communicate with the server 102 and/or data storage facility 104, to receive input and generate output to users via the UI 128 and to process data for providing educational recommender functionality as described further below. The ERI is a software module which includes a series of programmable instructions capable of being executed by the corresponding processor 126 (or 130 as described further below). The series of programmable instructions can be stored on a computer-readable medium, such as RAM, a hard drive, CD, smart card, 3.5" diskette, etc., for being executed by the processor 126 (or 130 as described further below) for performing the functions disclosed herein and to achieve a technical effect in accordance with the disclosure.

The UI 128 includes a user input device, such as a keypad, touchpad, touch screen or the equivalent, and a display device, such as indicator lights, a display screen, etc. The UI 128 may provide a GUI via which the user may enter and receive information. The communication devices may be integrated into the MFD 106 or may be provided as a separate unit. In addition to providing communication capabilities, the communication devices may buffer data, such as for safeguarding data in the event of a failure, such as a power failure or network crash.

Each of the first and second workstations 108 and 110 is a computing device, such as personal computer or a mobile computing device, having a hardware processor 130 (e.g., a microprocessor or CPU); a UI 132; at least one storage device (e.g., RAM, ROM, flash memory removable memory, etc.), and all necessary communication devices for communicating with the data storage facility 104, MFD 106, and/or server 102, either directly or via the network 112. The UI 132 includes a user input device, such as a keyboard, keypad, touchpad, mouse, touch screen or the equivalent, and a display device, such as indicator lights, a display screen, etc. The UI 132 may provide a GUI via which the user may enter and receive information. The processor 130 executes an ERI software module for enabling the processor 130 to communicate with the server 102, data storage facility 104, and/or MFD 106, to receive input and generate output to users via the UI 128, and to process data for providing educational recommender functionality as described further below. The ERI module executed by the processor 130 may be an enhanced version relative to the ERI module executed by the processor 126 of the MFD 106.

The network 112 may be the Internet, an intranet, an Ethernet, a LAN, a WAN, or other means for providing data communication between a plurality of digital devices. It is also envisioned that the data communication between any of the components of the recommender system 100 may be via a direct connection which may be wired or wireless. In the present example, the network 112 is the Internet.

Operation of the server 102 is now described. The stroke lifter module 114 analyzes image data associated with a scanned assessment. The stroke lifter module 114 recognizes each stroke that was marked by a student to indicate a response to a problem on the assessment, and generates corresponding stroke data. The stroke lifter module 114 may use a digital version of the assessment to distinguish between marks that are part of the assessment and strokes that were marked by the student. The generated data may be configured as metadata, for example.

The evaluator module 116 analyzes the stroke data to evaluate the student's performance on the assessment and generates evaluation data. The analysis may include applying one or more rubrics to determine if the stroke data indicates that a problem was answered right or wrong, determining a score (e.g., right or wrong) for each problem, for a group of problems, or for the entire assessment. The scores may be, for example, expressed as a percentage and/or a letter academic grade (e.g., A, A−, B, B+, etc.). When the evaluation module determines that a problem is wrong, it may further determine what type of error the student made and/or what area of an academic topic the student has not mastered. The evaluation data includes granular data that describes the results related to the analysis of individual problems and/or individual incorrect responses.

The structure and/or functionality associated with the server 104, MFD 106, and first and second workstations 108 and 110, as well as the functionality of the stroke lifter module 114 and evaluator module 134 are further described, either to supplement the above description or provide alternative designs, by U.S. patent application Ser. No. 12/339,979 to German et al., entitled "SYSTEM AND METHOD FOR RECOMMENDING EDUCATIONAL RESOURCES," filed on Dec. 19, 2008; U.S. patent application Ser. No. 12/340,054 to German et al., entitled "SYSTEM AND METHOD FOR RECOMMENDING EDUCATIONAL RESOURCES," filed on Dec. 19, 2008; U.S. patent application Ser. No. 12/340,116 to German et al., entitled "SYSTEM AND METHOD FOR RECOMMENDING EDUCATIONAL RESOURCES," filed on Dec. 19, 2008; U.S. patent application Ser. No. 12/237,692 to DeYoung et al., entitled "AUTOMATIC EDUCATIONAL ASSESSMENT SERVICE," filed on Sep. 25, 2008; U.S. patent application Ser. No. 12/339,804 to DeYoung et al., entitled "AUTOMATIC EDUCATION ASSESSMENT SERVICE," filed on Dec. 19, 2008; U.S. patent application Ser. No. 12/339,771 to DeYoung et al., entitled "AUTOMATIC EDUCATIONAL ASSESSMENT SERVICE," filed on Dec. 19, 2008; U.S. patent application Ser. No. 12/341,659 to Lofthus et al., entitled "SYSTEM FOR AUTHORING EDUCATIONAL ASSESSMENTS," filed on Dec. 22, 2008; U.S. patent application Ser. No. 12/640,426 to Venable, entitled "SYSTEM AND METHOD FOR REPRESENTING DIGITAL ASSESSMENTS," filed on Dec. 17, 2009; and U.S. application Ser. No. 12/624,960, to Perronnin et al., entitled "DIALOG SYSTEM FOR COMPREHENSION EVALUATION," filed on Nov. 24, 2009, each of which has been incorporated herein by reference in their entirety.

In one embodiment of the recommender system, the server 102 and data storage facility 104, referred to as the education recommender service (ERS) provider 150, provide a service to a client 160. The client includes the MFD 106 and the first and second workstations 108 and 110. Each client 160 may gain access to the service provided by the ERS provider 150, such as by subscribing to the service and/or loading appropriate software onto at least one MFD 106 and/or first and second workstations 108 and 110. The appropriate software may include application software data, such as the ERI software module. It is also envisioned that the ERS provider 150 provides a website that the client 160 can access and use to access the service provided by the ERS provider 150. The clients 160 may access the service for submitting a request for an educational recommendation or for submitting data to be stored in the data storage facility 104, such as student data or educational material data.

The service provider 150 receives and processes a request for a recommendation for an educational game. The request may include varying amounts of information, which may depend on what the user of the client who made the request is requesting. A variety of types of requests may be available to the user. The following is an exemplary, non-limiting list of different types of requests with the type of information that would be included in the request:

(A) A request for a non-specific game recommendation for one or more specific groups of students to play, which will include:
  (i) identification information (ID) for the students included in each group;
  (ii) academic areas, e.g., skills or academic subjects, in which the game should exercise the students; and
  (iii) selected characteristics that the game should have (e.g., physical, digital, uses primarily graphics, uses primarily text, etc.);

(B) A request for a recommendation of content for a selected game to be played by one or more specific groups of students, which will include:
  (i) ID for the students included in each group;
  (ii) II) for the selected game; and
  (iii) academic areas in which the game content should exercise the students;

(C) A request for a non-specific game recommendation for respective multiple groups to play, where the request includes forming the multiple groups from a large group of students, which will include:
  ((i) ID for the students included in the large group;
  (ii) academic areas in which the game should exercise the students;
  (iii) selected characteristics that the game should have;
  (iv) a selected number of groups that the large group should be broken into or a maximum and/or minimum number of students to be included in each group;
  (v) selected method of clustering (homogeneous or heterogeneous); and
  (vi) clustering criteria; and (D) A request for a recommendation of content for a selected game to be played by respective multiple groups, where the request includes forming the multiple groups from a large group of students and:
  ((i) ID for the students included in the large group;
  (ii) ID for the selected game; and
  (iii) academic areas in which the game content should exercise the students;
  (iv) a selected number of groups that the large group should be broken into or a maximum and/or minimum number of students to be included in each group;
  (v) selected method of clustering (homogeneous or heterogeneous); and
  (vi) clustering criteria.

The request is analyzed by the recommender module 118. If the request is of type (A) or (B), the recommendation may be different for each group. Likewise, for requests of the type (C) or (D), once the groups are formed, the recommendation may be different for each group. The recommendation for requests of type (A) and (C) includes a recommendation for the game as well as for the content of the game, whereas for requests of type (B) and (D), the recommendation is for the content of the selected game.

The content of the game refers to information that the game includes which is used by or presented to the student to play the game. The game refers to the way in which information is presented or played, and may include the rules of the game, physical components of the game (such as a game board, game cards and game pieces), and/or the GUI used to present the game. The content is selected based on a selected level of proficiency of selected students or of all of the students in a group that are playing the game. The content may be divided into multiple sets, wherein each set uses information that is selected based on a selected level of proficiency of selected students or of all of the students in the group. The difficulty level of the content can be adjusted, for example, by changing the level of proficiency or the size of the sets relative to one another. The information can be selected so that for each student there are at least "x" instances in which the information is presented wherein the student has a proficiency level (according to granular data for the student) below a selected level for that information. "X" is a number that is selected to provide challenge but not frustrate the student. Accordingly, the content is selected based on the granular data available for each of the students in the group, and may be selected to exercise proficiency of an academic area at a selected level of challenge for the students when considered as a group, and/or for each of the individual students in the group.

Figure 3:
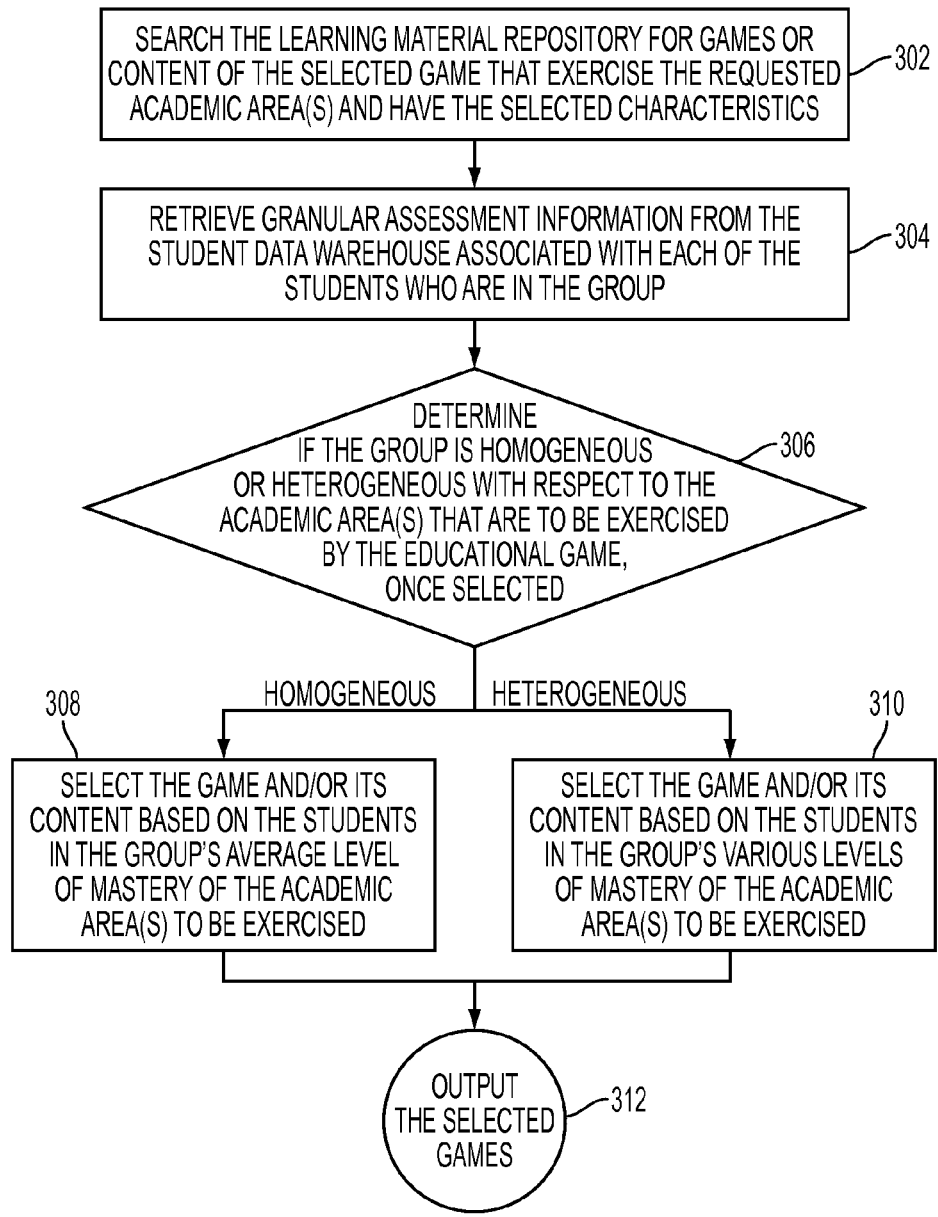
FIG. 3 shows a flowchart of a method for recommending an educational game in accordance with the present disclosure.

FIG. 3 shows a flowchart of a method for selecting a game or game content for a group, whether the group was specified in the request or was determined by the recommender module 118. Determination of groups is discussed further below with respect to FIG. 4. At step 302, the recommender module 118 searches the learning material repository 142 for games or content of the selected game that exercise the academic area (s) and have the selected characteristics specified in the request. At step 304, the recommender module retrieves granular assessment information associated with each of the students who are in the group from the student data warehouse 140. The recommender module 118 may use the student ID associated with each student in the group to look up the granular assessment information associated with the student.

At step 306, the recommender module 118 determines if the group is homogeneous or heterogeneous with respect to the academic area(s) that are to be exercised by the educational game, once selected. Whether the group is homogeneous or heterogeneous may be specified in the request (whether the groups were specified in the request or were formed by the recommender module 118) or may be determined by the recommender module 118 by comparing how similar the granular assessment information is for the students in the group with respect to the academic area(s) that are being exercised. The degree of similarity may be based on a default criterion, a criterion specified by the request, or a criterion set by an administrator of the server 102. The degree of similarity can be expanded to additional academic area(s), other than those specified in section (i.e., data field) (A)(ii), (B)(iii), (C)(ii), or (D)(iii) of the request. For example, the expansion may include academic area(s) that are specified in the request for the purpose of grouping the students or academic area(s) are designated as related to the specified in section (A)(ii), (B)(iii), (C)(ii), or (D)(iii) of the request. The designation may be specified, for example, with the data stored in the student data warehouse 140, by the software instructions included in the recommender module 118, or be selectable by the administrator of the server 102.

The criterion used for determining a degree of similarity may include, for example, assessments scores, evaluation results for individual problems, and types of errors made based on evaluation of incorrect responses. Determination of the degree of similarity may further include comparing other characteristics, such as gender, race, leadership qualities, etc. The other characteristics may be based on a default criterion, a criterion specified by the request, or a criterion set by an administrator of the server 102.

If the determination in step 306 is that the group is homogeneous, then step 308 is executed. At step 308, the game and/or its content is selected based on the students in the group's average level of mastery of the academic area(s) to be exercised. If the game includes two or more groups playing against one another, different content may be selected for each group to use during play of the game so that the level of the content correlates to the overall level of mastery of the students in each group. Execution continues at step 312.

If the determination in step 306 is that the group is heterogeneous then step 310 is executed. At step 310, the game and/or its content is selected based on various levels of mastery of the academic area(s) to be exercised by the students in the group. The level of the academic area(s) to be exercised may be selected, for example, to (a) aim at the average levels of the students in the group, (b) to include a range of levels that correlates to the range of levels of the students in the group, or (c) where the game exercises more than one academic area, an academic area level may selected for each academic area based on the level of a subset of one or more students in the group. If the level is selected in accordance with (a), the weaker students may feel challenged, or possibly frustrated and the stronger students may feel under challenged, or possibly bored. However, the above mentioned negative possibilities may be overcome due to the collaborative nature of the game, such that the stronger students may collaborate with the weaker students whereby both experience satisfaction and learn or reinforce skills or knowledge in the process. If the level is selected in accordance with (b), the students having weaker levels are bound to be even more challenged or frustrated by the more difficult tasks, but those tasks will function to stimulate the students having stronger levels. Likewise, the students having stronger levels are bound to be even more unchallenged or bored by the less difficult tasks, but those tasks will function to provide confidence to the students having weaker levels.

If the game includes two or more groups, e.g., which may be playing against one another, different content may be selected for each group to use during play of the game so that the level of the content correlates to the overall level of mastery of the students in each group or to the range of level of mastery of the students in each group. Each of the groups may be selected to have a heterogeneous composition of students, but where the overall or average levels of the groups are similar. For example, formation of a heterogeneous group may include pairing or grouping students that have complementary skills or knowledge or complementary levels of skills or knowledge. In this case, each of the groups may have a heterogeneous composition, but the groups may be homogeneous with respect to one another. Here, the level of the content may be selected in accordance with (a). In this case, the groups will all likely have similar levels of content. On the other hand, the content may be selected in accordance with (b). In this case, if the range of levels is different in the various groups, then a game and/or game content having different levels may be selected for each of the groups. If the content is selected in accordance with (c), students may be assigned to work on a task that utilizes a particular academic area, where the content is selected to match that student's strength in that academic area. Execution continues at step 312.

At step 312, a reply to the request is generated including the selected games and the reply is output to the user who submitted the request.

Figure 4:
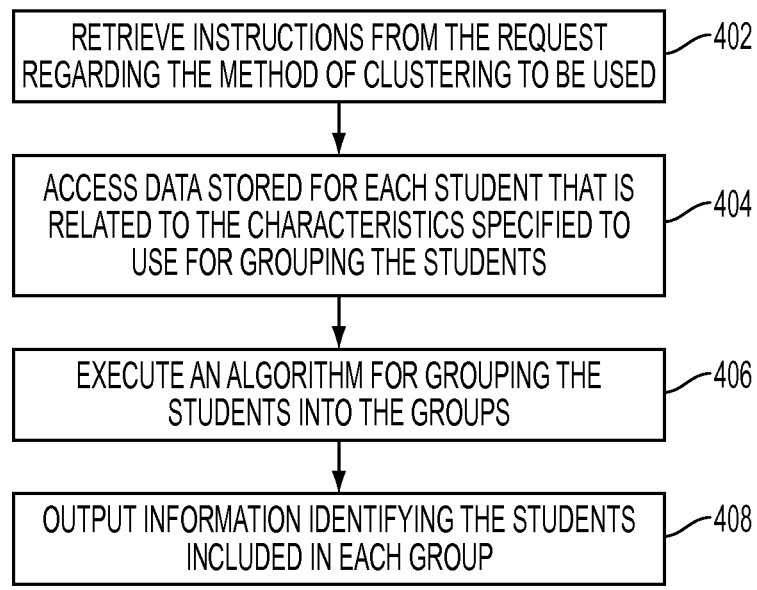
FIG. 4 shows a flowchart of a method for clustering students into groups for playing the educational games in accordance with the present disclosure.

FIG. 4 shows a method for forming two or more groups of students to play collaborative educational games from a large group of students, such as a class. Methods for forming groups or clustering students into groups for performing educational activities, e.g., based on sameness of the students, is described in U.S. application Ser. Nos. 12/339,979, 12/340, 054, and 12/340,116, all of which are incorporated herein by reference in their entirety. The term "to cluster" is used herein throughout to be synonymous with the term "to form groups," and the term "cluster" refers to a group that was formed from a larger group.

The determination of sameness may be based on satisfying a selected threshold distance (e.g., Euclidean, based on the Manhattan norm, or applying generalized normalization). Other methods for determining sameness include applying large scale clustering using non-negative matrix factorization on sparse graphs or other kernel clustering methods, which are described in greater detail below. One exemplary method of determining sameness uses similarity matrices. For example, let X be a K×N attribute matrix where K is the number of attributes and N the number of students. The dot product may be used as a measure of similarity between students, where the similarity matrix is given by X'X. In still another example, each student has an associated vector in which attribute data is encoded using values +1 and −1. The clustering includes determining the sameness of a first student having an associated vector u and a second student having an associated vector v, and applying a formula to u and v. In the present example the formula is $0.5*(1+\cos(u, v))$, but is not limited thereto.

In other words, the goal is to cluster students according to the results of one exam. In the case where the exam is a set of D questions/problems whose answers can be either "correct" or "incorrect" (this includes multiple choice tests, reading or spelling tests, etc.), then the results of the test are encoded as a D-dimensional vector with values +1 corresponding to correct answers and −1 corresponding to incorrect answers. The similarity between two students whose vectors are denoted u and v can thus be measured using the following formula: $0.5*(1+\cos(u,v))$. A similarity of 1 indicates perfect matching of the answers of two students (which might be used to detect cheaters), and a similarity of 0.5 indicates a perfect decorrelation. A similarity of 0 indicates anti-correlation (the two students have opposite answers to every single question (which might be used to detect complementarities).

At step 402, the recommender module retrieves instructions from the request regarding the method of clustering to be used for grouping the students into smaller groups. Default values will be used when not specified. The instructions may describe whether the groups to be formed should be homogeneous or heterogeneous, how many groups should be formed (which may be selected to be arbitrary), the maximum and/or minimum number of students to be included in each group, the degree of similarity or dissimilarity that should be used for grouping, whether the groups should be of equal size, what characteristics to use for grouping the students, a weight to use for each characteristic when grouping, and the algorithm to use for clustering the students.

At step 404, the recommender module 118 accesses data stored for each student that is related to the characteristics specified to use for grouping the students. This data should include granular assessment data related to one or more academic areas. It may also include other data, such as gender and leadership qualities.

At step 406, an algorithm is executing for grouping the students into the groups as specified. A variety of different algorithms that may be used for grouping the students is described below. At step 408, the students included in each group are identified and the information is output to the user who submitted the request, and/or to a subroutine or subprogram within the recommender module 118 that performs the recommendation described with reference to FIG. 3. The grouping information may be submitted to the user for approval or validation by the user before the recommender module 118 uses the group information to generate game recommendations.

The algorithms for grouping the students are now described. The algorithms are implemented as software that includes a series of programmable instructions can be stored on a computer-readable medium accessible by the processor 120, such as RAM, a hard drive, CD, smart card, 3.5" diskette, etc., for performing the functions disclosed herein and to achieve a technical effect in accordance with the disclosure.

The first algorithm provides a vector for each student which stores quantitative data indicative of the characteristics that are to be used for grouping the students. The data may be binary indicating whether or not an academic area was mastered, include a percentage value or score, include a number value that indicates strength of comprehension, a number value that indicates what type of mistake was made in an incorrect response, etc. These values may be normalized and then stored in the vector. The values stored in the vector may also be adjusted by a weight value (e.g., 0.1-1.0) to reflect their relative importance. The weight value is multiplied by the value that represents the characteristic that it is weighting.

To form homogeneous groups, the first algorithm determines similarity between students by performing an operation on the vectors corresponding to those students, including operations such as determining a dot product or a cosine similarity. A higher resulting value indicates a higher degree of similarity between the vectors, and thus between the students that they represent. To form heterogeneous groups, instead of determining the measure of similarity, the first algorithm measures dissimilarity between the vectors. For example, the measure of dissimilarity may be (1−cosine), where high values indicate a higher degree of dissimilarity.

A second algorithm groups the students homogenously into pairs of students. The second algorithm models a large group of students to be clustered as a fully connected graph, where each node (also referred to as vertex) corresponds to a student. An edge between two nodes is weighted by the similarity between the students. Using this graphical representation, one example of a method for matching pairs includes finding the set of edges that:

(A) the sum of the weights on those edges is maximal (this is to ensure the best possible compatibility); and
(B) no two edges share a common node (this is to ensure that pairs of students are formed).

This method solves a problem known as the maximum matching problem. The Edmonds's matching algorithm, an algorithm known in the art, provides an efficient way to solve the problem by forming a set of pairs by iteratively improving an initial empty set of pairs.

A third algorithm clusters students homogenously into two groups which are not necessarily of equal size. One exemplary implementation includes using a graphical representation, including cutting a graph in order to partition its nodes into two disjoint subsets. In a weighted graph, the size of a cut is defined by the sum of the weights of the edges crossing the cut. This third algorithm can be implemented as a minimum cut problem which includes finding the cut with the minimum size. This may be solved efficiently using the Ford-Fulkerson algorithm, which is an algorithm known in the art.

A fourth algorithm clusters the students homogenously to form an arbitrary number of groups. The fourth algorithm may use an algorithm known in the art for clustering based on pair-wise similarities. Examples of such algorithms known in the art include agglomerative clustering, K-medoids, normalized cuts, and non-negative matrix factorization on sparse graphs factorization. The last example is described in U.S. application Ser. No. 12/109,496, to Perronnin et al., entitled "CLUSTERING USING NON-NEGATIVE MATRIX FACTORIZATION ON SPARSE GRAPHS," filed on Feb. 25, 2008, which is incorporated herein by reference in its entirety. The exemplary algorithms described here with respect to the fourth algorithm may also be used by the third algorithm.

The following are a few exemplary educational games that are played by two or more students. In the first game, Sight Word "Bingo," the students are clustered into homogeneous groups. Each group is provided with a unique deck of sight word cards (to be used by the student acting as the caller) and Bingo cards. The content of the deck of cards and Bingo cards is selected based on the proficiency of the students in the group in reading sight words as indicated by granular assessment data.

In this example, the content of the game refers to the content of the deck of cards and Bingo cards, which refers to which sight words are included on each card in the deck of cards and on each of the Bingo cards. The sight words selected for the game may include, for example, at least two sets of at least one sight word each. The sight words in each set are selected based on a selected level of proficiency of selected students or of all of the students in the group for reading those sight words. The difficulty level of the content can be adjusted, for example, by changing the level of proficiency or the number of cards included in one or more of the sets. The sight words can be selected so that for each student there are at least "x" sight words that the student has a proficiency level below a selected level, where "x" is a number that is selected to provide challenge but not frustrate the student. Accordingly, the content is selected based on the granular data available for each of the students in the group, and may be selected to exercise sight word proficiency at a selected level of challenge for the students when considered as a group, and/or for each of the individual students in the group.

These cards may be provided in digital form and are then printed on MFD 106. The students may prepare the game by cutting the sight word and Bingo cards from the printed sheets of paper, cardboard or stickers. Alternatively, each student may be provided with an electronic game terminal (e.g., a handheld electronic device with a display device and a user interface, or a computer workstation) that displays the Bingo card designated for that child. Each child receives a unique Bingo card. Each Bingo card has a different selection of sight words that is a subset of the group of sight words in the deck of sight word cards. The words in each card are arranged in columns and rows, with the columns labeled, such as by the letters "B," "I," "N," "G," "O."

The caller randomly selects a card from the deck of sight word cards and calls out the word printed on the card and the column it belongs in. The students check their Bingo card to see if their card has the called word in the called column. If so the student marks the word. The first student to form a consecutive series of five marked words, in a row, column, or diagonal, wins the game. The game may be played by the group a designated number of times or during a designated game period (e.g., "learning centers") over a designated period of time. After an assessment is administered testing the students' proficiency in sight word reading, the students may be re-clustered into new groups. Each group may be assigned a new game to play, or the same game, but with new content, e.g., different sight words on the sight word deck and Bingo cards.

A second game example is played by students that have been heterogeneously clustered into three or more teams, each having two students. A unique deck of "Go Fish" cards is generated for each team of students in accordance with their level of proficiency in recognizing individual letters and blended letter sounds, as indicated by granular assessment data. The Go Fish deck includes, for example, "N" pairs of cards, each pair of card having the same letter or blended letters printed on it, (e.g., 2 cards with the letter "P" and 2 cards with the digraph "th") for a total of "2N" cards. "N" is selected based on how large the group of students being clustered is.

In this example, the content of the game refers to the content of the deck of Go Fish cards, which refers to which individual and blended letters (referred to collectively as "letters") are included on each card in the deck. The letters are selected to provide a selected level of difficulty for each team and/or for each student included in a team based on the granular data available for each of the students in each of the teams.

These cards may be provided in digital form and are then printed on MFD 106. The children may use scissors to cut the cards from printed sheets of paper or cardboard to form the deck. Alternatively, each student may be provided with an electronic game terminal that displays cards from the deck that are designated or dealt for that child. The deck is mixed and each team is dealt seven cards to hold, referred to as a "hand," with the remaining cards initially face down in a stack. The object is for a team to eliminate all cards in its hand by laying down identical cards, face up, and saying the corresponding sound.

The teams take turns by asking a specified team if they possess a card with a certain letter. They phrase their request by asking, "Do you have a card with a letter having the sound "T?"" If so, the card with a "T" printed on it is handed over to the requesting team, a pair is formed, laid down, its sound pronounced, and the requesting team continues making requests until the answer is "No." Thereupon, the requesting team draws a card from the remaining card stack. If that drawn card matches the last request, the requesting team's turn continues. If not, the next team in turn begins to request.

Play continues accordingly. The game ends when the remaining stack card is empty and each team has consecutively received an answer "No." The winning team is the team that has the most pairs laid out. The game can be played again by collecting, shuffling and re-dealing the cards. The game may be played by the group a designated number of times or during a designated game period (e.g., "learning centers") over a designated period of time. After an assessment is administered testing the students' proficiency in individual and blended letter sound recognition, the students may be re-clustered into new groups. Each group may be assigned a new game to play, or the same game, but with new content, e.g., with different individual letters and blended letters included in the Go Fish deck.

Another game uses both homogenous and heterogeneous clustering. This game is played similarly to the Go Fish game described above, except that each of the teams is composed of a pair of students that are heterogeneously clustered so that the students who are paired together in a team complement one another, e.g., one is weak and one is strong in mastery of the educational area being exercised (e.g., individual/blended letter sound recognition). But when the combined strengths of the students in each team are compared, each team has a similar mastery of the academic area. In other words, the teams that are grouped to play the game together are homogeneously clustered, and the teams are homogeneous with respect to one another. Again, the content of the game is selected to challenge each team and/or the individual students in the team at a selected level based on the granular data available for each of the students. In this case, where the students within a team have complementary strengths, the range of difficulty of content to be used for each team may be greater than if the team had a homogeneous composition.

Finally, an exemplary customized digital game for two or more groups of clustered children to play electronically is described. In the present example, the game exercises math fluency for addition of numbers 0-9, however it could be used to exercise other academic areas, such as spelling, reading fluency, etc. A determination of whether a word is read correctly or not may be made by using digital voice recognition or a by a human referee (e.g., another student or a teacher). First-grade students are grouped into homogeneous pairs with respect to their math fluency abilities as indicated by granular assessment data.

The students in each pair use an electronic game terminal (e.g., a handheld device or a computer workstation having a display device and keyboard) and play against one another. The students' electronic devices may communicate with one another, e.g., directly (wired or wireless) or via a network (e.g., a LAN, WAN or the Internet) and/or with a controlling device. Student 1 starts first. Play proceeds as follows:

The game terminal for each student displays "2+4=?"

Student 1 must respond within a selected time period (e.g., 5 seconds, but this may be decreased automatically as math fluency improves, as indicated by granular assessment data and/or game play).

Student 1's response is displayed to both students. Student 2 can accept the answer as correct or challenge it with an answer of his/her own (also within a selected time period).

If Student 2's challenge is correct, then his/her turn starts.

Exemplary rules of the game are as follows:

Points are awarded for correct answers for both the original answer and a correct challenge.

Players switch being Student 1 and Student 2 when an incorrect answer is correctly challenged or when five consecutive correct answers are given.

Problem difficulty is increased, first exercising areas in which the players show greater strength, as indicated by granular assessment data, and then exercising areas in which both students exhibit weakness.

The time for giving a response is decreased as the players improve in their accuracy and measured fluency, as indicated by granular assessment data and/or game play.

Different times for each player to respond may be used based on individual needs, characteristics, rates of increased fluency, etc., as indicated by granular assessment data and/or game play In accordance with the above game examples and the above disclosure, the games are played by two or more students. They students are clustered into teams having one or more students. A team of multiple students may be assigned a game that involves the team working together collaboratively to perform a task. Alternatively, the students within the team may compete against one another to achieve a goal. In another example, two or more teams may be formed to compete against one another, where the students in each team collaborate together. The teams may be formed heterogeneously or homogeneously.

The game and/or the content of the game is selected to exercise the clustered students in accordance with their level of proficiency in the academic area(s) that are being exercised by the game, as indicated by granular assessment data. This may include exercising the students' weaknesses (e.g., for challenge or to develop strength) or strengths (e.g., to reinforce or build confidence). In this example, the content of the game refers to the math fluency problems presented to the student. Accordingly, the math problems are selected in accordance with the granular data available for each of the students in the group, and may be selected to exercise math fluency proficiency at a selected level of challenge for the students when considered as a group, and/or for each of the individual students in the group.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A recommender system for recommending an educational game to be used by a group of at least two students, the system comprising:
    at least one tangible processor; and
    a memory with instructions to be executed by the at least one tangible processor for:
        receiving a request to recommend an educational game to use with a group of at least two students;
        accessing student data relating to the at least two students including granular assessment data, wherein the granular assessment data includes a result of at least one assessment administered to respective students of the at least two students, wherein each assessment of the at least one assessment includes a plurality of problems for assessing each of the at least two students and the result includes an independent evaluation of each respective problem of the plurality of problems;
        associating each of the at least two students with a D-dimensional vector encoding the granular assessment data for that student, the vector including values indicative of an evaluation of each answer to D respective problems, wherein the value for each of the D problems is +1 for a correct answer and −1 for an incorrect answer;
        determining a similarity of a first student having an associated vector u and a second student having an associated vector v, and applying the formula $0.5*(1+\cos(u,v))$ to u and v;
        comparing the similarity of the student data for the at least two students;
        assigning the at least two students as belonging to one of a homogeneous and heterogeneous group based on the similarity;
        selecting an educational game from a plurality of educational games, wherein the selecting includes:
            in response to the at least two students being assigned to the homogeneous group, selecting the educational game based on an average level of mastery for the academic area being exercised for the group, and
            in response to the at least two students being assigned to the heterogeneous group, selecting the educational game based on various levels of mastery for the academic area being exercised; and,
        outputting the selected game.

2. The recommender system according to claim 1, wherein the at least two students are clustered into at least two groups to play the game.

3. The recommender system according to claim 2, wherein the clustering of the two groups is performed in accordance with a selected method consisting of a method for clustering homogeneously, a method for clustering heterogeneously, and a method for clustering heterogeneously such that the at least two groups are homogeneous with respect to one another.

4. The recommender system according to claim 3, wherein the homogeneous and heterogeneous quality of a group is determined with respect at least to proficiency in the academic area being exercised as indicated by the granular data associated with each student clustered.

5. The recommender system according to claim 1, wherein the at least two students are clustered as one group of at least two groups clustered from a class of a plurality of students so that each of the at least two groups includes at least two students.

6. The recommender system according to claim 5, wherein the assigning further includes:
    assigning at least four students into at least two heterogeneous groups each being homogeneous with respect to one another.

7. The recommender system according to claim 5, wherein the clustering of the at least two groups is performed using an algorithm for non-negative matrix factorization on sparse graphs factorization.

8. The recommender system according to claim 1, wherein the educational game is at least one of physical and electronic.

9. The recommender system according to claim 1, wherein selecting the educational game includes selecting content of the educational game, wherein the content includes information that is used by or presented to the at least two students to play the game.

10. The recommender system according to claim 9, wherein selecting the content includes forming at least two sets, wherein each set uses information that is selected based on a selected level of proficiency of at least one of selected students or all of the students of the at least two students.

11. The recommender system according to claim 10, wherein the difficulty level of the content is adjusted by changing the level of proficiency or the size of the sets of the at least two sets relative to one another.

12. A method for recommending an educational game to be used by a group of at least two students, the method comprising:
    receiving by a tangible processor a request to recommend an educational game to use with a group of at least two students;
    accessing by the tangible processor student data relating to the at least two students including granular assessment data, wherein the granular assessment data includes a result of at least one assessment administered to respective students of the at least two students, wherein each assessment of the at least one assessment includes a plurality of problems for assessing each of the at least two students and the result includes an independent evaluation of each respective problem of the plurality of problems; and
    selecting by the tangible processor an educational game from a plurality of educational games that exercises the at least two students, when they play the game, in an academic area, including selecting the level of the academic area exercised based on granular assessment data associated with each of the respective at least two students;
    associating each of the respective at least two students with a D-dimensional vector encoding the granular assessment data for that student, the vector including values indicative of an evaluation of each answer to D respective problems, wherein the value for each of the D problems is +1 for a correct answer and −1 for an incorrect answer;

determining a similarity of a first student having an associated vector u and a second student having an associated vector v, and applying the formula $0.5*(1+\cos(u,v))$ to u and v;

comparing the similarity of the student data for the at least two students;

assigning the at least two students as belonging to one of a homogeneous and heterogeneous group based on the similarity;

in response to the at least two students being assigned to the homogeneous group, selecting the educational game based on an average level of mastery for an academic area being exercised for the group; and, in response to the at least two students being assigned to the heterogeneous group, selecting the educational game based on various levels of mastery for the academic area being exercised for the group; and, outputting the selected game.

13. The method according to claim 12, wherein the method further includes clustering the at least two students by a method of clustering selected from a group of methods of clustering consisting of: a) clustering the at least two students into at least two groups to play the game; and b) clustering the at least two students as one group of at least two groups, including clustering the at least two groups from a plurality of students so that each of the at least two groups includes at least two students.

14. The method according to claim 13, further comprising assigning at least four students into at least two heterogeneous groups each being homogeneous with respect to one another.

15. The method according to claim 14, wherein the homogeneous and heterogeneous quality of a group is determined with respect at least to proficiency in the academic area being exercised as indicated by the granular data associated with each student clustered.

16. The method according to claim 12, wherein selecting the educational game includes selecting content of the educational game, wherein the content includes information that is used by or presented to the at least two students to play the game.

17. The method according to claim 16, wherein selecting the content includes forming at least two sets, wherein each set uses information that is selected based on a selected level of proficiency of at least one of selected students or all of the students of the at least two students.

18. The method system according to claim 17, wherein the difficulty level of the content is adjusted by changing the level of proficiency or the size of the sets of the at least to sets relative to one another.

19. A non-transitory computer-readable medium storing a series of programmable instructions configured for execution by at least one hardware processor for recommending an educational game to be used by a group of at least two students, comprising the steps of:

receiving a request to recommend an educational game to use with a group of at least two students;

accessing student data relating to the at least two students including granular assessment data, wherein the granular assessment data includes a result of at least one assessment administered to respective students of the at least two students, wherein each assessment of the at least one assessment includes a plurality of problems for assessing each of the at least two students and the result includes an independent evaluation of each respective problem of the plurality of problems;

associating student in the group with a D-dimensional vector encoding the granular assessment data for that student, the vector including values indicative of an evaluation of each answer to D respective problems, wherein the value for each of the D problems is +1 for a correct answer and −1 for an incorrect answer;

determining a similarity of a first student having an associated vector u and a second student having an associated vector v, and applying the formula $0.5*(1+\cos(u,v))$ to u and v;

comparing the similarity of the student data for the at least two students;

assigning the at least two students as belonging to one of a homogeneous and heterogeneous group based on the similarity;

in response to the at least two students being assigned to the homogeneous group, selecting the educational game based on an average level of mastery for an academic area being exercised for the group using the student data;

in response to the at least two students being assigned to the heterogeneous group, selecting the educational game based on various levels of mastery for the academic area being exercised for the group using the student data; and, outputting the selected game.

20. The computer-readable medium according to claim 19, wherein:

the selecting the educational game includes selecting content of the educational game;

the content includes information that is used by or presented to the at least two students to play the game; and the selecting the content includes forming at least two sets, wherein each set uses information that is selected based on a selected level of proficiency of at least one of selected students or all of the students of the at least two students, wherein the difficulty level of the content is adjusted by changing the level of proficiency or the size of the sets of the at least to sets relative to one another.

* * * * *